T. C. Taylor,
Metal Air-Tight Vessels.
Nº 52,909.     Patented Feb. 27, 1866.

Witnesses:
R. T. Campbell

Inventor:
T. C. Taylor
by his Attys
Mason, Fenwick & Lawrence

UNITED STATES PATENT OFFICE.

T. C. TAYLOR, OF PHILADELPHIA, PENNSYLVANIA.

IMPROVEMENT IN CONSTRUCTING AIR-TIGHT VESSELS.

Specification forming part of Letters Patent No. 52,909, dated February 27, 1866; antedated February 16, 1866.

*To all whom it may concern:*

Be it known that I, T. CHALKLEY TAYLOR, of the city and county of Philadelphia, in the State of Pennsylvania, have invented a new and useful Mode of Constructing Air-Tight Vessels for certain purposes hereinafter mentioned; and I do hereby declare the following to be a full, clear, and exact description of the same, reference being had to the annexed drawings, in which—

Figure 1:
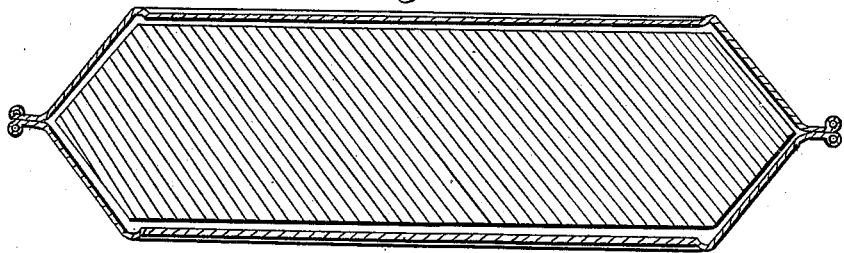
Figure 2:
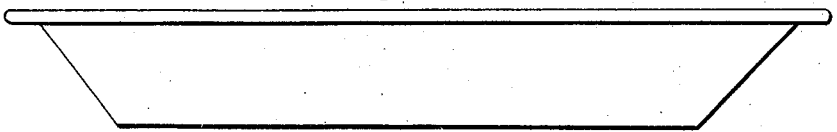
Figure 3:
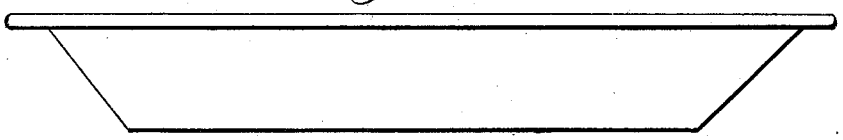

Figure 1 is a section of the vessel when completed. Fig. 2 is a side view of the bottom portion thereof. Fig. 3 is a side view of the top portion.

The object of my invention is to construct a vessel of two parts each of which is a useful utensil in itself and so shaped that they may be readily applied and soldered to each other, so as to form an air-tight vessel adapted to receive various commodities which are to be preserved or transported free from contact with air or moisture and to be separated when desirable without injury into the two utensils of which it is composed, thus being made to serve a double and useful purpose.

I propose to construct the two utensils of which my air-tight vessel is composed of some sheet metal, preferring tin to any other. I also prefer utensils in the form of table-plates, or such as can be used for baking pies and other articles. The flaring outer edges of these may be so shaped that they shall fit accurately to each other and by the use of a little solder may be rendered perfectly air-tight, and of a convenient shape to contain various commodities, and in which they may be transported to any desirable distance.

For attaching the two plates together I prefer the use of soft solder, which permits of the vessel being readily opened with a knife, and which can be easily removed without injury to the utensil to which it has been made to adhere.

It will be seen at once that these plates may be made of very unequal depths. In fact, they may consist of other forms than that of plates without departing from the principle which characterizes this invention.

This invention is especially intended for the benefit of men in the army or in the mines, or otherwise located at some distant point, so that the vessel in which preserves or other commodities are sent them will be composed of the very utensils of which they will especially stand in need after the contents are removed.

I am aware that air-tight vessels have been so constructed that after being used for their original purposes one portion thereof might be transformed into a pail or other useful commodity; but in that case another portion was destroyed or rendered useless. In the vessel proposed by me nothing is destroyed or left useless, but both the parts of which it is composed is a useful utensil, without any change of shape.

Having thus described my invention, what I claim as new, and desire to secure by Letters Patent, is—

An air-tight vessel composed of two table-plates or pans or other similar culinary utensils of sheet metal so united as to be proof against air and moisture and capable of being readily separated into their separate forms without injury or waste of any part of their original material, substantially as described.

In testimony whereof I have hereunto subscribed my name this 16th day of June, A. D. 1865.

T. C. TAYLOR.

Witnesses:
R. T. CAMPBELL,
E. SCHAFER.